(12) United States Patent
MacLean et al.

(10) Patent No.: US 12,152,131 B2
(45) Date of Patent: Nov. 26, 2024

(54) CELLULOSIC COMPOSITES COMPRISING WOOD PULP

(71) Applicant: West Fraser Mills Ltd., Vancouver (CA)

(72) Inventors: Brian MacLean, Quesnel (CA); Edwin Peace, Quesnel (CA); Jeffrey Jacob Cernohous, Hudson, WI (US); Dean Justin Elliott, Albany, OR (US)

(73) Assignee: Millar Western Forest Products Ltd., Edmonton (CA)

( * ) Notice: Subject to any disclaimer, the term of this patent is extended or adjusted under 35 U.S.C. 154(b) by 734 days.

(21) Appl. No.: 17/167,488

(22) Filed: Feb. 4, 2021

(65) Prior Publication Data
US 2021/0171738 A1   Jun. 10, 2021

Related U.S. Application Data

(63) Continuation-in-part of application No. 16/090,036, filed as application No. PCT/CA2017/000071 on Mar. 30, 2017.

(60) Provisional application No. 62/315,737, filed on Mar. 31, 2016, provisional application No. 62/315,722, filed on Mar. 31, 2016, provisional application No. 62/315,731, filed on Mar. 31, 2016, provisional application No. 62/315,744, filed on Mar. 31, 2016.

(51) Int. Cl.
| C08L 1/02 | (2006.01) |
|---|---|
| C08K 3/34 | (2006.01) |
| C08K 3/40 | (2006.01) |
| C08K 5/00 | (2006.01) |
| C08L 23/06 | (2006.01) |
| C08L 23/12 | (2006.01) |
| C08L 97/02 | (2006.01) |

(52) U.S. Cl.
CPC .............. C08L 1/02 (2013.01); C08L 23/06 (2013.01); C08L 23/12 (2013.01); C08L 97/02 (2013.01); C08K 3/34 (2013.01); C08K 3/40 (2013.01); C08K 5/0025 (2013.01); C08L 2207/062 (2013.01); C08L 2310/00 (2013.01)

(58) Field of Classification Search
CPC ...................................................... C08L 97/02
See application file for complete search history.

(56) References Cited

U.S. PATENT DOCUMENTS

| 2,550,143 | A | 4/1951 | Eger |
|---|---|---|---|
| 4,248,743 | A | 2/1981 | Goettler |
| 5,082,605 | A | 1/1992 | Brooks |
| 5,088,910 | A | 2/1992 | Goforth |
| 2009/0214442 | A1 | 8/2009 | Agarwal et al. |
| 2012/0208933 | A1 | 8/2012 | Hamilton et al. |
| 2013/0210964 | A1 | 8/2013 | Cernohous et al. |
| 2014/0316036 | A1 | 10/2014 | Kosonen et al. |
| 2016/0002461 | A1 | 1/2016 | Tsujii et al. |

FOREIGN PATENT DOCUMENTS

| IN | 104334794 A | 2/2015 |
|---|---|---|
| JP | 2015-511187 | 4/2015 |

OTHER PUBLICATIONS

Mertens et al. (Journal of Applied Polymer Science, 2017, 45161, p. 1-11) (Year: 2017).*
Lopez, J.P. et al. "Stone-ground wood pulp-reinforced polypropylene composited: water uptake and thermal properties" Bioresources 2012, 7(4), 5478-5487. Published Nov. 1, 2012 (see entire document).
Du, Y. et al. "A simplified fabrication process for biofiber-reinforced polymer composites for automotive interior trim applications" Journal of Materials Science 2014, 49, 2630-2639. Published online Dec. 19, 2013 (See entire document).
George Wypych (Editor), "Plasticizers in Various Processing Methods," in Handbook of Plasticizers 2d Ed. 521 (2012.
Aline Cobut, Houssine Sehaqui & Lars A. Berglund, "Cellulose Nanocomposites by Melt Compounding of TEMPO-Treated Wood Fibers in Thermoplastic Starch Matrix," 9 BioResources 3276 (2014).

* cited by examiner

*Primary Examiner* — Liam J Heincer
(74) *Attorney, Agent, or Firm* — McMillan LLP

(57) ABSTRACT

The present invention discloses cellulosic composites that include mechanical or chemical pulp, and methods for producing such cellulosic composites. Embodiments of such composites may exhibit improved mechanical properties and moisture resistance when compared to composites derived from conventional cellulosic feedstock.

27 Claims, 3 Drawing Sheets

CELLULOSIC COMPOSITES COMPRISING WOOD PULP

This application is a Continuation-In-Part of U.S. application Ser. No. 16/090,036 which is National Stage Entry of PCT/CA2017/000071 which claims the benefit of U.S. Provisional Application No. 62/315,731 filed on Mar. 31, 2016, and U.S. Provisional Application No. 62/315,722 filed on Mar. 31, 2016, and U.S. Provisional Application No. 62/315,737 filed on Mar. 31, 2016, and U.S. Provisional Application No. 62/315,744 filed on Mar. 31, 2016, the contents of each of which are incorporated herein by reference.

TECHNICAL FIELD

The present invention relates to cellulosic composites that include mechanical or chemical wood pulp, and methods for producing such cellulosic composites. Embodiments of such composites may exhibit improved mechanical properties and moisture resistance when compared to composites derived from conventional cellulosic feedstock.

BACKGROUND ART

There is increasing demand for cost effective composite materials derived from renewable feedstock. Cellulosic materials have been previously used as fillers in thermoplastics. For example, wood plastic composites (WPCs) have found application in a multitude of commercial products in recent years, and the overall market for WPCs is estimated to be billions of dollars annually. WPCs are widely used in the construction and automotive industries. WPCs are often more cost effective than conventional mineral or glass filled composites. WPCs also generally have the look of natural wood, which can be desirable. However, conventional WPCs typically have poorer mechanical properties and lower moisture resistance than to mineral and glass filled composites.

Cellulosic composites based on chemically processed pulp have been recently developed and commercialized. Chemically processed pulp is cellulosic material produced using chemical pulping processes, such as kraft or sulfite processes, that involve chemical treatment and high temperatures. These chemical pulping processes remove much of the hemicelluloses and lignin from the pulp, so that the resulting chemical pulp contains little or no residual lignin. For example, the lignin content of chemical pulp is usually less than 5% and often less than 1% by weight.

Composites based on chemically processed pulp generally have improved mechanical properties, lower odor than WPCs. Further, chemically processed pulp composites can be pigmented or colored like conventional thermoplastics. However, composites based on chemically processed pulp are typically more expensive than WPCs and mineral filled composites. They also have poorer mechanical properties and moisture resistance when compared to mineral or glass filled composites. For these reasons, to date, commercial adoption of composites based on chemically processed pulp has usually occurred in niche applications.

It is therefore desirable to find cellulosic composites that have improved moisture resistance or improved mechanical properties than conventional known cellulosic composites.

SUMMARY OF INVENTION

According to an aspect of the invention, there is provided a cellulosic composite that includes a mechanical pulp having lignin and a polymeric matrix. The lignin in the mechanical pulp is about 15% to 35% of the dry weight of the mechanical pulp.

According to another aspect of the invention, there is provided a process for making a cellulosic composite including the steps of melt processing a mixture comprising mechanical pulp and a polymeric matrix to form a masterbatch; and further melt processing the masterbatch to form the composite.

According to yet another aspect of the invention, there is provided a process for making an article of manufacture including the steps of melt processing a mixture comprising mechanical pulp and a polymeric matrix; and extruding the melt processed mixture into the article.

BRIEF DESCRIPTION OF DRAWINGS

In the figures which illustrate by way of example only, embodiments of the present invention.

DESCRIPTION OF EMBODIMENTS

Figure 1:
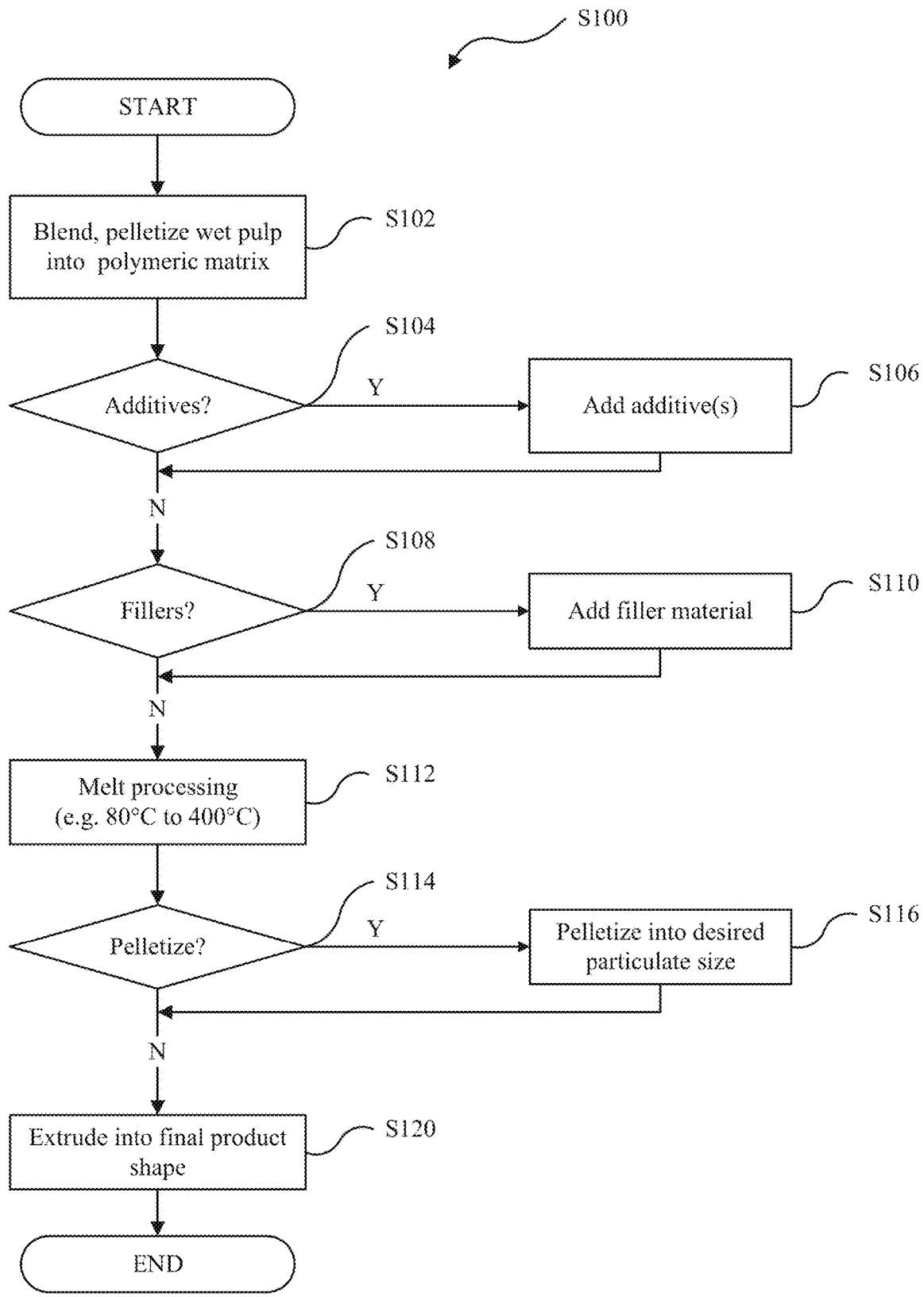
FIG. 1 is a simplified flowchart depicting steps in an exemplary process for making cellulosic composites and articles manufactured therefrom.

Aspects of the present disclosure relate to cellulosic composites based on wood pulps. Some embodiments of these composites are more cost effective, have improved moisture resistance and/or improved mechanical properties when compared to cellulosic composites known in the art, such as composites based on chemically processed pulp.

Cellulosic composites that contain wood pulp and a polymeric matrix are described. When such pulp is incorporated into a polymeric matrix, it is capable of improving certain attributes of the resulting polymeric composite. In certain embodiments, such composites have exhibited improved mechanical properties and improved moisture resistance.

Exemplary processes for the preparation of cellulosic composites that have wood pulp incorporated in a polymeric matrix are also described. Exemplary embodiments of these processes involve melt processing pulp with a relatively high moisture content. The moisture content of the pulp prior to melt processing may be greater than 10 wt % in some embodiments; while in other embodiments, the moisture content is greater than 20 wt %; and in yet other embodiments, the moisture content may be greater than 30 wt %.

These processes for creating cellulosic composites can enable the preparation of composites with pulp substantially uniformly dispersed in a polymeric matrix. In some embodiments they are used to produce a masterbatch, comprising a high concentration of pulp in a polymeric matrix. The masterbatch can be let down or diluted with further polymeric matrix to a desired loading level.

The use of wet pulp or pulp with high moisture content in these exemplary embodiments of the processes described herein has the beneficial effect of enabling the preparation of composites with pulp that is substantially uniformly dispersed in the polymeric matrix. The pulp is better separated and randomized within the matrix, with fewer hydrophilic clumps. Composites exemplary of embodiments of the present invention produced in a continuous process using a twin-screw extruder, have dispersion measures of 6 clumps per 81.25 cm$^2$ or 7.38 clumps per 100 cm$^2$ at a height of about 1.14 mm. As will be discussed with reference to FIG. 3 later, this compares with 13.8 clumps per 100 cm$^2$ at a height of 1.14 mm known in the prior art which uses a batch process and a Brabender mixer (see for example, U.S. Pat. No. 4,248,743 t Goetller).

Exemplary cellulosic composites as described herein may also include one or more additives that further improve one or both of the mechanical or chemical properties of the composites. For example, in some embodiments, the cellulosic composites may include a coupling agent or an antioxidant.

Other exemplary cellulosic composites may also include one or more additional fillers that further improve the mechanical or chemical properties of the composites.

Yet other embodiments of the cellulosic composites described herein can be converted into articles using conventional extrusion and molding techniques. These articles have utility in a variety of markets including automotive, building and construction, consumer and appliance applications, and 3D printing among others.

The following terms found in this disclosure are used as follows:

"Cellulosic Composite" is used to refer to a composite material that comprises a polymeric matrix and a cellulosic filler.

"Chemically processed pulp" or "chemical pulp" is used to refer to cellulosic material produced using a chemical pulping process, such as kraft or sulfite pulping processes.

"Composite" is used to refer to a material comprising a polymeric matrix and a filler.

"Coupling Agent" is used to refer to an additive that improves the interfacial adhesion between a polymeric matrix and a cellulosic filler.

"Mechanical Pulp" is used to refer to a cellulosic material produced using a mechanical pulping process or a chemi-mechanical pulping process. For example, "mechanical pulp" includes thermo-mechanical pulp (TMP), refiner mechanical pulp (RMP), chemi-thermomechanical pulp (CTMP), medium density fiber (MDF), ground wood pulp (GWP) and bleached chemi-thermomechanical pulp (BCTMP).

"Melt Processable Composition" is used to refer to a formulation that is capable of being melt processed, typically at elevated temperatures, by means of conventional polymer melt processing techniques such as extrusion or injection molding, for example.

"Melt Processing Techniques" is used to refer to various melt processing techniques that may include, for example, extrusion, injection molding, blow molding, rotomolding, thermokinetic mixing or batch mixing.

"Polymeric Matrix" is used to refer to a melt processable polymeric material.

The description is not intended to describe all embodiments or every possible implementation of the present technology. The detailed description is intended to provide some illustrative embodiments.

The present disclosure relates to composites based on wood pulp that, in at least some embodiments, are more cost-effective, and/or have improved moisture resistance and/or have improved mechanical properties compared to known cellulosic composites. The cellulosic composites described herein include wood pulp incorporated into a polymeric matrix.

The wood pulp that is incorporated into the cellulosic composites may be manufactured using a mechanical or a chemi-thermomechanical process. In producing mechanical pulp, wood is generally ground against a water-lubricated abrasive surface such as a rotating stone. The heat generated by grinding softens the lignin binding the fibers, and the mechanized forces separate the fibers referred to as ground wood (GWD).

In embodiments of the present invention, refiners may be used. Refiners were developed during the second half of the 20$^{th}$ century. In a refiner, woodchips are subjected to intensive shearing forces between a rotating steel disc and a fixed plate to produce refiner mechanical pulp (RMP). In subsequent modifications to this process, the woodchips are pre-softened by heat make the fibrillation more effective, producing thermo-mechanical pulp (TMP) that is generally light-colored and has longer fibers.

A further development of thermo-mechanical pulp is CTMP, in which the wood chips are impregnated with chemicals such as sodium sulphite before the grinding step. The resulting CTMP is generally even lighter in color and has better strength characteristics. After grinding, the pulp is sorted by screening to remove unrefined fiber bundles. It can then be further bleached with peroxide to produce BCTMP for use in higher value-added products.

The mechanical pulp used in the composites described is characterized by having a high content of residual lignin. In particular the lignin content in mechanical pulp is higher than in chemical pulps. In some embodiments, the lignin content in the mechanical pulp is greater than 10 wt %; while in other embodiments the lignin content in the mechanical pulp is greater than 15 wt %; and in yet other embodiments the lignin content in the mechanical pulp may be greater than 20 wt %. In some cases the mechanical pulp is a chemi-thermomechanical pulp with a lignin content in the range of 15 wt % to 35 wt %. These are dry weight percentages of lignin in the mechanical pulp.

The wood pulp can be incorporated into any suitable polymeric matrix to form cellulosic composites with enhanced mechanical and chemical properties. In some embodiments, the pulp loading in the polymeric matrix is in the range of about 5-99 wt %; while in other embodiments, the pulp loading is in the range of about 10-95 wt %; and in yet other embodiments the pulp loading is between 10-90 wt %. In some embodiments the pulp loading in a masterbatch is in the range of 50-99 wt %. These are dry weight percentages of pulp in the final composite or masterbatch.

The polymeric matrix may comprise one or more polymers. Non-limiting examples of polymers that can be used in embodiments of the present cellulosic composites include: high density polyethylene (HDPE), low density polyethylene (LDPE), linear low density polyethylene (LLDPE), functional polyolefin copolymers including polyolefin-based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polylactic acid (PLA), polyacetals, polycarbonates, polyphenylene oxides, polyurethanes, thermoplastic elastomers (e.g., SIS, SEBS, SBS), or combinations thereof. For some end-use applications, polyolefins are well-suited to serve as polymeric matrices, for example, in articles useful as automotive components.

Bioplastics polymers useful in this invention include, biobased, biodegradable or compostable polyesters, polyamides, polyurethanes, polyacrylates, polyolefins, thermoplastic starches and cellulosics. Bioplastics of particular interest include biobased, biodegradable or compostable polyesters. Non limiting examples of biobased or biodegradable or compostable polyesters include: PLA (Polylactic acid), PHA (Polyhydroxyalkanoates), PBAT (polybutyrate adipate terephthalate), PBS (polybutylene succinate), PCL (polycaprolactones), PGA (Polyglycolic acid).

Polylactic acid is increasingly proving to be a viable alternative to petrochemical-based plastics in many applications. PLA is produced from renewable resources and is biodegradable. This makes it well suited for green or environmentally sensitive applications. In addition, PLA has unique physical properties that make it useful in several industrial applications including paper coating, fibers, films, packaging materials and the like.

The polymeric matrix may optionally contain one or more additives. Non-limiting examples of conventional additives include antioxidants, light stabilizers, fibers, blowing agents, foaming additives, antiblocking agents, heat stabilizers, impact modifiers, biocides, antimicrobial additives, compatibilizers, plasticizers, tackifiers, processing aids, lubricants, coupling agents, flame retardants, pigments and colorants. The additives may be incorporated into the melt processable composition in the form of powders, pellets, granules, or in other extrudable forms. The amount and type of additives incorporated in the melt processable composition can be suitably chosen, depending upon the polymeric matrix and the desired physical properties of the finished composition. Those skilled in the art of melt processing are capable of selecting appropriate amounts and types of additives for a specific polymeric matrix and mechanical pulp filler in order to achieve desired physical properties of the finished composite material.

Some embodiments of the present cellulosic compositions include coupling agents and/or antioxidants as additives. Non-limiting examples of coupling agents include silanes, zirconates, titanates and functionalized polymers. Preferred coupling agents include silane and maleic anhydride grafted polymers. Non-limiting examples of maleic anhydride grafted polymers include those sold under the tradenames Polybond (Addivant), Extinity (NWP), Integrate (Lyondell Basell), and Fusabond (DuPont). Preferred antioxidants include monomeric, polymeric and oligomeric phenols. Non-limiting examples of antioxidants include those sold under the tradenames Irganox, Irgaphos (BASF) and Hostanox (Clariant). Typical loading levels of coupling agents and antioxidants are approximately 0.1 to 10 wt % of the composite formulation.

Some embodiments of the present cellulosic compositions comprise one or more additional fillers. These can be incorporated in the melt processable composition, and can be used to adjust the mechanical properties of the final cellulosic composite material or articles made therefrom. For example, fillers can function to improve mechanical and thermal properties of the cellulosic composite. Fillers can also be utilized to adjust the coefficient of thermal expansion (CTE) of the cellulosic composite, to make it more compatible with other materials with which it is to be used, for example. Non-limiting examples of fillers include mineral and organic fillers (e.g., talc, mica, clay, silica, alumina, carbon fiber, carbon black, glass fiber) and conventional cellulosic materials (e.g., wood flour, wood fibers, non-wood plant fibers, sawdust, wood shavings, newsprint, paper, flax, hemp, wheat straw, rice hulls, kenaf, jute, sisal, peanut shells, soy hulls, or other cellulose containing materials), and optionally additional lignin. The amount and type of filler in the melt processable composition can be suitably chosen depending upon the polymeric matrix and the desired physical properties of the finished composition. Fillers such as calcium carbonate, talc, clay and cellulosic fiber are well-suited for many applications. In some embodiments, the additional filler makes up 1 wt % to 90 wt % of the composite; in some embodiments, 5 wt % to 75 wt % of the composite; and in some embodiments 1 wt % to 60 wt % of the composite.

Cellulosic composites based on pulp, and incorporating optional additives and/or additional fillers, can be prepared by blending the components into the polymeric matrix. Depending on the type and nature of polymeric matrix, this can be done using a variety of conventional mixing processes. For melt processable thermoplastic compositions, the polymeric matrix and additives can be combined by any suitable blending technique commonly employed in the plastics industry, such as with a compounding mill, a Banbury mixer, or a mixing extruder. The mixing operation may be conveniently carried out at a temperature above the melting point or softening point of the polymeric matrix. In some cases melt processing of the mixture is performed at a temperature from 80° C. to 400° C., although suitable operating temperatures are selected depending upon the melting point, melt viscosity, and thermal stability of the composite formulation. Different types of melt processing equipment, such as extruders, may be used to process the melt processable compositions described herein.

The resulting melt-blended mixture can be either extruded directly into the form of the final product shape or can be pelletized or otherwise comminuted into a desired particulate size or size distribution, and then fed to an extruder, such as a twin-screw extruder, that melt-processes the blended mixture to form the final product shape.

A flowchart depicted in FIG. 1 illustrates the above exemplary process. An exemplary process S100 starts with mixing wet pulp into a polymer matrix in step S102. If the optional use of additives is desired in step S104 then additives are added to the mixture (step S106), but otherwise the step S106 is bypassed. Similarly, if the optional use of fillers is desired (step S108) then fillers are added to the mixture (step S110), but otherwise step S110 is bypassed. As noted above, for melt processable thermoplastic compositions, the polymeric matrix and additives can be combined by any suitable blending technique such as with a compounding mill, a Banbury mixer, or a mixing extruder. In Step S112 melt processing is used, which in this embodiment may be at a temperature from 80° C. to 400° C. Depending on the decision on whether to pelletize/comminute at step S114, the output of step S112 is either extruded directly into the form of the final product shape (step S120) or can be pelletized or otherwise comminuted (S116) into a desired particulate size or size distribution, and then fed to an extruder, such as a twin-screw extruder, that melt-processes the blended mixture to form the final product shape (step S120). The melt-processing step in embodiments of the present invention, such as step S120, is continuous melt processing for example, using twin screw extrusion.

In known processes for the preparation of cellulosic composites, the pulp is typically dry or has a low moisture content. It can be difficult to pull apart or break up the pulp and achieve adequately uniform dispersion of the pulp in the polymeric matrix.

Preferred embodiments of processes for the preparation of cellulosic composites comprising mechanical or chemical pulp involve melt processing the pulp with a relatively high moisture content. In some embodiments, the moisture content of the pulp prior to melt processing is greater than 10 wt %; in preferred embodiments, the moisture content is greater than 20 wt %; and in particularly preferred embodiments, the moisture content is greater than 30 wt %. In some embodiments, the moisture content of the pulp prior to melt processing is in the range of 40 wt % to 60 wt %.

It has been found that using mechanical or chemical pulp with a relatively high moisture content can facilitate the dispersion of the pulp in the polymeric matrix during melt processing of the mixture. Addition of a solvent can further improve dispersion. The moisture tends to aid separation of the pulp fibers, and moist pulp tends to break apart more easily than dry pulp, which has a tendency to become matted and consolidated. The water is gradually removed, for example by evaporation, during the melt processing steps. This innovative wet processing approach can enable the preparation of composites with pulp substantially uniformly dispersed in a polymeric matrix, and can enable the preparation of composites with high loadings of pulp in a polymeric matrix. For example, loadings of greater than 95 wt % in the composites can be achieved.

In some embodiments of processes for the preparation of cellulosic composites comprising pulp, the pulp is provided dry or with a low moisture content, and the water content of the pulp is increased prior to melt processing the pulp with the polymeric matrix. For example, dry cakes of pulp can be rehydrated by adding water, and then the pulp and can be melt processed with the polymeric matrix and any other desired components of the composite as described herein.

In some embodiments of processes for preparing the present cellulosic composites and articles made therefrom, the cellulosic composites are produced in a process involving two melt processing steps. First, a masterbatch of the pulp composite is produced by melt processing pulp with a high moisture content as described above, with a thermoplastic polymeric matrix, and optionally other additives or fillers. The resulting masterbatch has a high concentration of pulp, and can be subsequently letdown (or diluted) to a more suitable loading level for the final application using a second melt processing step (e.g., compounding, injection molding or extrusion). In preferred embodiments, the masterbatch has a pulp content in the range of about 50 wt % to 99 wt %, and the letdown has a pulp content in the range of about 5 wt % to 50 wt %.

Figure 2:
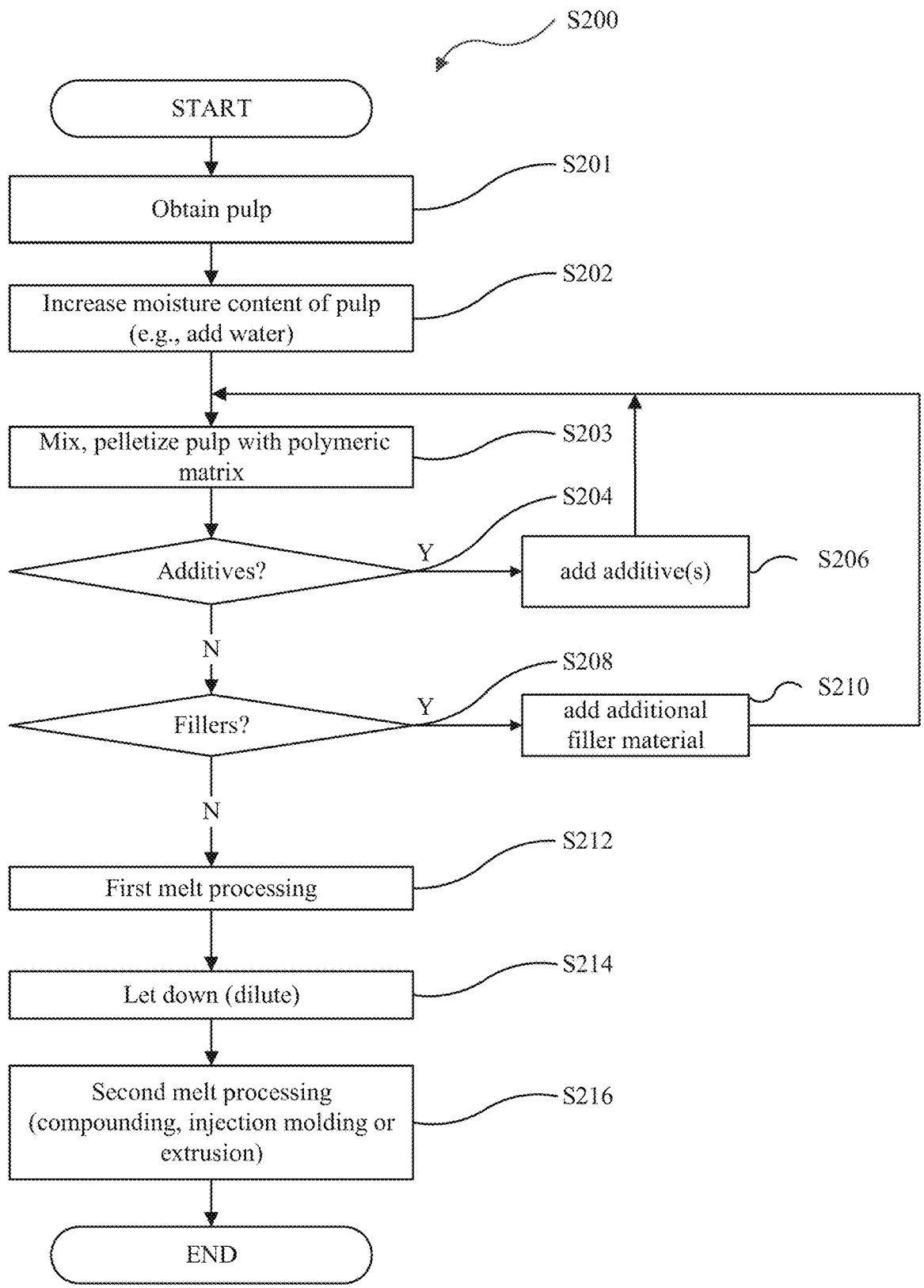
FIG. 2 is a flowchart diagram depicting steps involved in a process, exemplary of an embodiment of the present invention, for preparing cellulosic composites comprising mechanical pulp.

The above exemplary process is illustrated in FIG. 2. As shown, an exemplary process S200 starts with obtaining pulp S201. As noted above, the pulp at step S201 may be provided dry or with a low moisture content. In step S202 moisture is introduced into the pulp, for example, by adding water.

In step S203 the pulp is mixed or combined with the polymeric matrix. If the optional use of additives is desired in step S204 then additives are added to the mixture (step S206), but otherwise the step S206 is bypassed. Similarly, if the optional use of fillers is desired (step S208) then fillers are added to the mixture (step S210), but otherwise step S210 is bypassed.

In Step S212 a first of two melt processing steps is used to form a masterbatch. The resulting masterbatch may have high concentration of pulp. In some embodiments, the resulting masterbatch from step S212 may contain pulp that is in the range of about 50 wt % to 99 wt %.

This masterbatch from step S212 is subsequently let down or diluted in step S214. The diluted masterbatch from step S214 may contain pulp in the range of about 5 wt % to 50 wt %.

A second melt processing step S216 is subsequently employed to obtain the desired cellulosic composite comprising pulp. The melt processing in step S216 may include compounding, injection or extrusion.

Embodiments of the cellulosic composites described herein have broad utility in the automotive, building and construction, consumer and appliance markets. Non-limiting examples of potential uses of cellulosic composites of this disclosure include automotive components, decking, fencing, railing, roofing, siding, consumer utensils, containers and 3D printed components.

Articles produced by melt processing the cellulosic composites described herein can exhibit superior characteristics. For example, they may have improved mechanical properties and/or moisture resistance.

TABLE 1

MATERIALS

| Material | Supplier |
|---|---|
| High density polyethylene (HDPE) | Ineos T5-440 119 HDPE, commercially available from Bamberger Polymers, Inc, Jericho, NY |
| Polypropylene (PP) | Ineos H35G-00, Polypropylene Homopolymer, commercially available from Bamberger Polymers, Inc, Jericho, NY |
| CTMP | Chemi-Thermomechancial Pulp, commercially available from West Fraser Mills, Quesnel, BC, Canada |
| Glass | StarStran 738, commercially available from Johns Manville Inc., Denver, CO |
| Talc | Silverline 303, commercially available from Imerys, Inc, San Jose, CA |
| Anti-oxidant (AO) | Hostanox PEPQ, commercially available from Clariant Inc., Muttenz, Switzerland |
| Coupling Agent (CA) | Integrate NP507030, commercially available from Lyondell Basell Inc., Houston, TX |
| Thrive ™ | 30% Cellulose filled PP, commercially available from Weyerhaeuser Inc., Federal Way, WA. |

TABLE 2

EXPERIMENTAL MASTERBATCH FORMULATIONS

| Sample | HDPE wt % | PP wt % | CTMP wt % | AO wt % |
|---|---|---|---|---|
| MB1 | 5 | — | 95 | — |
| MB2 | 4 | — | 95 | 1 |
| MB3 | — | 5 | 95 | — |
| MB4 | — | 4 | 95 | 1 |

TABLE 3

EXPERIMENTAL COMPOSITE SAMPLE FORMULATIONS

| Sample | HDPE wt % | PP wt % | MB1 wt % | MB2 wt % | MB3 wt % | MB4 wt % | Talc wt % | Glass wt % | CA wt % | Thrive™ wt % |
|---|---|---|---|---|---|---|---|---|---|---|
| 1 | 66.7 | — | 33.3 | — | — | — | — | — | — | — |
| 2 | 66.7 | — | — | 33.3 | — | — | — | — | — | — |
| 3 | — | 66.7 | — | — | 33.3 | — | — | — | — | — |
| 4 | — | 66.7 | — | — | — | 33.3 | — | — | — | — |
| 5 | — | 65.7 | — | — | 33.3 | — | — | — | 1 | — |
| 6 | — | 65.7 | — | — | — | 33.3 | — | — | 1 | — |
| CE1 | 70 | — | — | — | — | — | 30 | — | — | — |
| CE2 | 70 | — | — | — | — | — | — | 30 | — | — |
| CE3 | — | 70 | — | — | — | — | 30 | — | — | — |
| CE4 | — | 70 | — | — | — | — | — | 30 | — | — |
| CE5 | — | — | — | — | — | — | — | — | — | 100 |

Mechanical pulp, in this case CTMP, having a moisture content of approximately 50% and a lignin content of approximately 25% wt % based on dry weight, was first run through an electric 5" pellet mill such as are commercially available from Pellet Masters, Chippewa Falls, WI) to densify and pelletize the material. Four different masterbatch samples, MB1-4, were prepared with different compositions as shown in TABLE 2, each having a high concentration of CTMP (95%). The masterbatch samples were prepared by dry blending the pelletized moist CTMP with HDPE or PP, and in two cases an anti-oxidant additive, in a plastic bag, and then gravimetrically feeding the mixture into a 27 mm twin screw extruder (52:1 L:D, commercially available from Entek Extruders, Lebanon, OR). The compounding was performed using the following temperature profile in zones 1-13 (° F.): 100, 350, 400, 400, 400, 400, 400, 400, 400, 400, 400, 400, 400. The material was run though the extruder with the die removed and collected as a dry particulate.

Masterbatch samples, MB1-4, were subsequently letdown (diluted), by mixing with an additional quantity of the thermoplastic polymeric matrix (HDPE or PP), and in two cases a coupling agent, as shown in TABLE 3, to form six composite Samples 1-6. The components were dry blended in a plastic bag and gravimetrically fed into a 27 mm twin screw extruder (52:1 L:D, commercially available from Entek Extruders, Lebanon, OR). The compounding was performed using the following temperature profile in zones 1-13 (° F.): 100, 350, 400, 400, 400, 400, 400, 400, 400, 400, 400, 400, 400 and a die temperature of 380° F. The composites were extruded into strands and pelletized into pellets approximately 1-2 mm in length.

Samples CE1-4, having compositions as indicated in TABLE 3 were also similarly prepared as comparative examples. The talc and glass fiber were side fed downstream in zone 6. Sample CE5 was obtained from Weyerhaeuser Inc.

The resulting composite samples were injection molded into test specimens and their properties tested following ASTM D790 (flexural properties) and ASTM D638 (tensile properties). Specific Gravity was determined using Archimedes Method. Impact testing (Izod impact) was performed following ASTM D256. Moisture uptake was determined by gravimetric analysis after 24 and 96 hour submersion in water. The results of this testing are given in TABLE 4 below.

TABLE 4

EXPERIMENTAL RESULTS

| Sample | Flexural Modulus (kpsi) | Flexural Strength (kpsi) | Specific Gravity (g/cm$^3$) | Izod Impact Unnotched (ft-lbs/in) | Moisture Uptake 96 hr (%) |
|---|---|---|---|---|---|
| 1 | 285 | 4.9 | 1.05 | 2.01 | 2.4 |
| 2 | 342 | 5.4 | 1.05 | 2.06 | 1.3 |
| 3 | 410 | 8.0 | 1.02 | 2.72 | 1.2 |
| 4 | 429 | 8.1 | 1.02 | 2.95 | 0.8 |
| 5 | 417 | 10.5 | 1.02 | 2.95 | 0.8 |
| 6 | 444 | 11.0 | 1.02 | 4.14 | 0.8 |
| CE1 | 222 | 3.9 | 1.16 | 4.13 | 0.02 |
| CE2 | 509 | 4.7 | 1.16 | 2.17 | 0.01 |
| CE3 | 389 | 7.5 | 1.12 | 3.56 | 0.01 |
| CE4 | 688 | 8.8 | 1.12 | 2.78 | 0.01 |
| CE5 | 422 | 9.5 | 1.02 | 4.9 | 1.3 |

Results for Samples CE1-CE5 are provided as comparative examples, and demonstrate properties for conventional glass- and talc-filled PP and HDPE composites. CE5 demonstrates properties reported for Thrive™, which is a commercially available cellulose-filled polypropylene composite comprising chemical pulp from a kraft pulping process. Results for Samples 1 to 6 demonstrate properties of cellulosic mechanical pulp based composites according to certain embodiments of the present invention.

Some of the composite samples comprising mechanical pulp (CTMP) exhibited comparable or superior properties relative to CE5 (Thrive™), with respect to flexural modulus and moisture uptake. Samples 5 and 6, comprising a polypropylene matrix and a coupling agent, performed particularly well. The coupling agent appeared to enhance the properties as may be observed by comparing results for Sample 3 with Sample 5, and Sample 4 with Sample 6.

Other lignin-containing materials, besides the mechanical pulps described herein, may be incorporated into a polymeric matrix to produce composites in a similar manner. For example, lignin-containing fibers from woody and non-woody sources, including grasses and recycled materials, for example, may be processed and incorporated into composites. Lignin contents of non-woody materials and pulps can range upwards from 5% by weight.

Advantages Over Prior Art

I. Improved Uniformity

Figure 3:
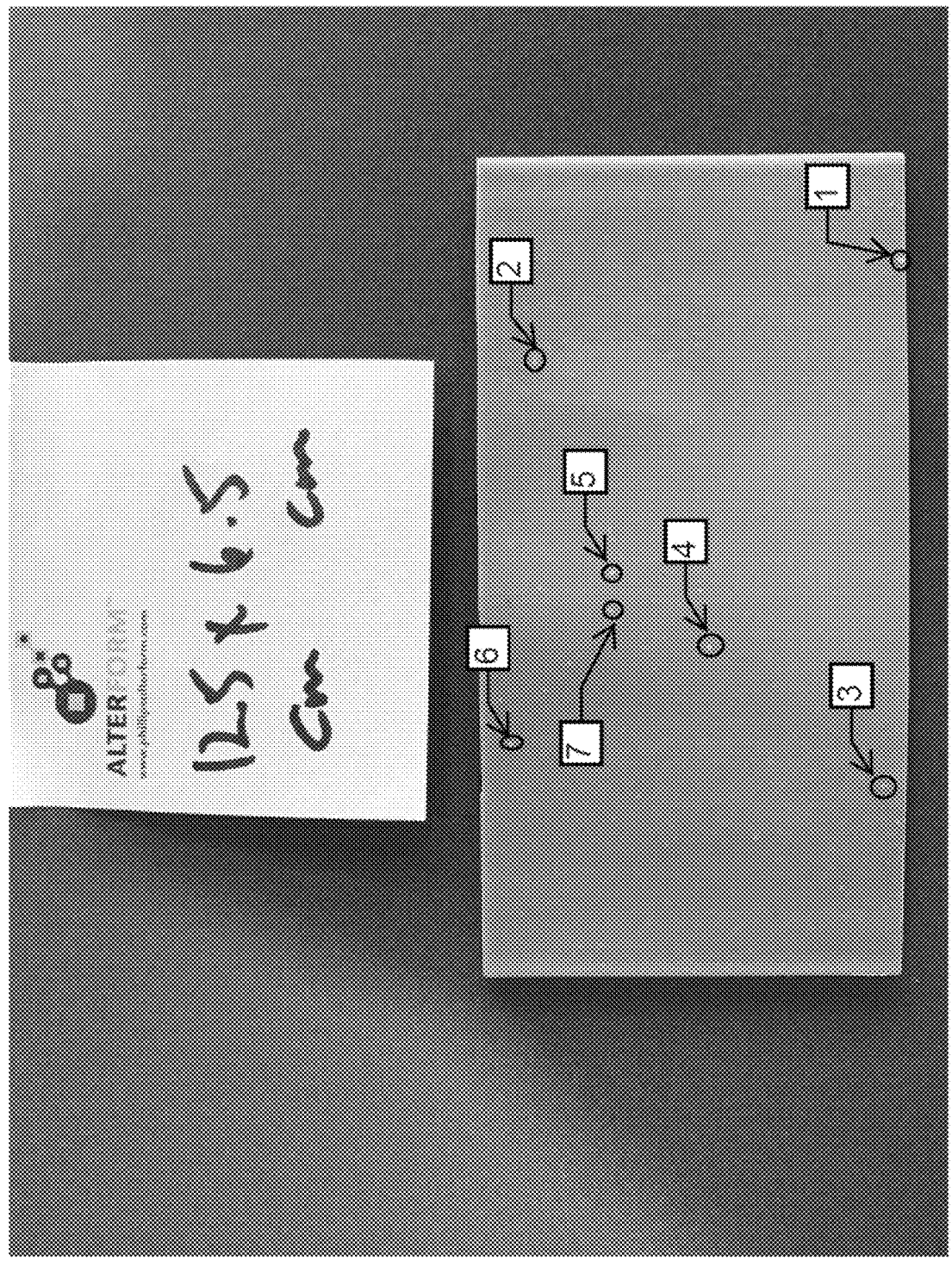
FIG. 3 is an image of sample of material produced using exemplary processes of the present invention depicting few clumps.

The dispersion rate in U.S. Pat. No. 4,248,743 to Goettler is 13.8 small undispersed clumps per 100 cm$^2$ (see Col. 9, line 20-21 of Goettler). In contrast, the present invention as has no more than 7.38 clumps of pulp per square centimeter as shown in FIG. 3. The claimed composite thus exhibits a vastly improved dispersion uniformity than the prior art. As shown in FIG. 3, the specs or clumps labelled 1 to 6, in the 12.5 cm×6.5 cm sample lead to a dispersion measure of 7.38 clumps per 100 cm² as illustrated in the table below. WFM refers to West Fraser Mills Inc., the applicant of the present invention.

TABLE 5

DISPERSION MEASURE

| | No. of clumps | Area (cm²) | H (cm) | W (cm) | Dispersion (per 100 cm²) | change in no. of clumps |
|---|---|---|---|---|---|---|
| Goettler | 13.8 | 100 | | | 13.8 | |
| WFM | 5 | 81.25 | 12.5 | 6.5 | 6.15 | −55.4% |
| WFM | 6 | 81.25 | 12.5 | 6.5 | 7.38 | −46.5% |
| WFM | 7 | 81.25 | 12.5 | 6.5 | 8.62 | −37.6% |
| WFM | 8 | 81.25 | 12.5 | 6.5 | 9.85 | −28.7% |
| WFM | 9 | 81.25 | 12.5 | 6.5 | 11.08 | −19.7% |
| WFM | 10 | 81.25 | 12.5 | 6.5 | 12.31 | −10.8% |
| WFM | 11 | 81.25 | 12.5 | 6.5 | 13.54 | −1.9% |

II. Continuous Melt-Processing of Wet Pulp

In addition, exemplary embodiments use continuous melt processing of wet pulp.

Furthermore "Melt processing" as used in the present disclosure is not disclosed in Goettler. What appears to be disclosed in Goettler for example is a process of mastication which essentially involves blending at room temperature, and compression for about 35 minutes. For example, at Col. 5, ll. 58-60, Goettler states "[t]he mixtures are transferred to an even speed mill to orient the fiber and are sheeted out to 1.14 mm. They are cured the next day by heating in a press for 35 minutes at 153° C. . . . "

In the embodiments of the present invention however, "Melt Processing Techniques" is used to refer to various melt processing techniques that may include, for example, extrusion, injection molding, blow molding, rotomolding, thermokinetic mixing or batch mixing. The residence time when using processes that are exemplary of embodiments of the present invention is in the order of a few minutes—typically less than two minutes. Residence time refers to the time the resin or material to be is in the barrel before being expelled/injected.

The process in some prior art disclosures such as Goettler is akin to compression molding rather than melt processing as used in the present application. In Goettler, there is no melt processing per se.

At least some embodiments of the present invention use a continuous process as opposed to the batch processing (such as is used in Goettler). The water is gradually removed during the melt processing, for example, by evaporation, during the melt processing steps, whereas in prior art implementations such as Goettler "are cured the next day by heating in a press for 35 minutes at 153° C.".

The present disclosure thus uses a continuous process. The residence time is in the order of a few minutes, typically two minutes or less. The present application discusses the use of specific twin screw extruder models to facilitate continuous processing.

Persons of skill in the art would appreciate that the twin screw extrusion is a continuous process. For example, FIG. 14.12 of Wypych, [George Wypych (Editor), Plasticizers in Various Processing Methods, in Handbook of Plasticizers 2d Ed. 521 (2012) ("Wypych")] on page 536, depicts a co-rotating twin screw extruder which is described as a continuous production on p. 537 which states "FIG. 14.12 shows continuous production of chewing gum 101. Each component of the formulation has separate storage tank (1-5) and it is added through different entry ports (10, 18, 8, 16, 20). It is noticeable that entry ports are sparsely distributed along the extruder barrel. This prevents unwanted back flow of the components which could create discontinuities in the final product."

In contrast to the residence time of typically less than two minutes in a twin screw extruder such as the Entek model described earlier, the residence time in prior art systems such as Goettler is about 35 minutes or more, a day later.

In the present invention, water is gradually removed during the melt processing steps rather than "cured the next day by heating in a press for 35 minutes at 153° C.".

III. Masterbatch with High Pulp Loadings are Enabled

The present invention allows for formation of a masterbatch with pulp loading of 50-99% (and 80-99%).

Such high loading proportions of pulp are not practically feasible with the process disclosed in Goettler. Attempting to achieve such loading proportions with the prior art process would entail very high cost.

Moreover, prevention of re-agglomeration in water is extremely difficult without the continuous melt processing disclosed and claimed in the present invention.

IV. Woodchips/Chunks Rather than Pulp Sheet Form

In the exemplary embodiments of the present invention, the pulp comprises shredded wood chips/chunks that are each about ¼" to ½" in size. In prior art processing of wet pulp such as Goettler however, the pulp is provided in sheet form.

Although specific embodiments have been illustrated and described herein, it will be appreciated by those of ordinary skill in the art that a wide variety of alternate embodiments or equivalent implementations may be substituted for the specific embodiments shown and described without departing from the scope of the present invention. This application is intended to cover adaptations or variations of the embodiments discussed herein. Therefore, it is manifestly intended that this invention be limited only by the claims and the equivalents thereof.

What is claimed is:

1. A cellulosic composite comprising wood pulp obtained by continuously melt processing wet wood pulp having greater than 10 wt % moisture and polymeric matrix, wherein the pulp is substantially uniformly dispersed within the polymeric matrix so that there are no more than 7.38 clumps of pulp per 100 square centimeters of the cellulosic composite at a height of approximately 1.14 mm, and wherein the proportion of the pulp is in the range of more than 50% and up to 99% by weight of the composite.

2. The cellulosic composite of claim 1, wherein said melt continuously processing forms a masterbatch.

3. The cellulosic composite of claim 1, wherein said wet wood pulp has moisture content of at least 20 wt %.

4. The cellulosic composite of claim 3, wherein said wet wood pulp has moisture content of at least 25 wt %.

5. The cellulosic composite of claim 1, wherein the wood pulp is one of mechanical pulp and chemical pulp.

6. The cellulosic composite of claim 5, wherein the wood pulp is said chemical pulp.

7. The cellulosic composite of claim 6, wherein said chemical pulp is kraft pulp obtained via a kraft process.

8. The cellulosic composite of claim 5, wherein the pulp is said mechanical pulp.

9. The cellulosic composite of claim 8, wherein the mechanical pulp comprises lignin, the lignin making up 5% to 35% of the dry weight of the pulp.

10. The cellulosic composite of claim 1, wherein the proportion of the pulp is in the range of more than 50% and up to 95% by weight of the composite.

11. The cellulosic composite of claim 10, wherein the proportion of the pulp is in the range of more than 50% and up to 90% by weight of the composite.

12. The cellulosic composite of claim 10, wherein the proportion of the pulp is in the range of 80% to 99% by weight of the composite.

13. The cellulosic composite of claim 1, wherein the polymeric matrix comprises at least one of: high density polyethylene, low density polyethylene, linear low density polyethylene, functional polyolefin copolymers including polyolefin based ionomers, polypropylene, polyolefin copolymers, polystyrene, polystyrene copolymers, polyacrylates, polymethacrylates, polyesters, polyvinylchloride (PVC), fluoropolymers, polyamides, polyether imides, polyphenylene sulfides, polysulfones, polylactic acid (PLA), polyacetals, polycarbonates, polyphenylene oxides, polyurethanes, and thermoplastic elastomers.

14. The cellulosic composite of claim 1, wherein the polymeric matrix comprises bioplastics polymers comprising at least one of: biobased polyesters, biodegradable polyesters, compostable polyesters, polyamides, polyurethanes, polyacrylates, polyolefins, thermoplastic starches, cellulosics, PLA (Polylactic acid), PHA (Polyhydroxyalkanoates), PBAT (polybutyrate adipate terephthalate), PBS (polybutylene succinate), PCL (polycaprolactones), and PGA (Polyglycolic acid).

15. The cellulosic composite of claim 13, wherein the polyolefin copolymers comprise one of: ethylene-butene, ethylene-octene and ethylene vinyl alcohol; and wherein said polystyrene copolymers comprise one of: high impact polystyrene, and acrylonitrile butadiene styrene copolymer.

16. The cellulosic composite of claim 1, comprising an additive.

17. The cellulosic composite of claim 16, wherein the additive is at least one of: antioxidant, light stabilizer, fiber, blowing agent, foaming additive, antiblocking agent, heat stabilizer, impact modifier, biocide, antimicrobial additive, compatibilizer, plasticizer, tackifier, processing aid, lubricant, coupling agent, flame retardant, pigment and colorant.

18. The cellulosic composite of claim 16, wherein the additive is a coupling agent.

19. The cellulosic composite of claim 18, wherein the coupling agent is at least one of: silane, zirconate, titanate, functionalized polymer and maleic anhydride grafted polymer.

20. The cellulosic composite of claim 18, wherein the coupling agent is in the range of 0.1% to 10% by weight of the composite.

21. The cellulosic composite of claim 1, further comprising additional filler.

22. The cellulosic composite of claim 21, wherein said additional filler comprises at least one of: talc, mica, clay, silica, alumina, carbon fiber, carbon black, glass fiber, wood flour, wood fibers, non-wood plant fibers, sawdust, wood shavings, newsprint, paper, flax, hemp, wheat straw, rice hulls, kenaf, jute, sisal, peanut shells, soy hulls, lignin, calcium carbonate and cellulosic fiber.

23. The cellulosic composite of claim 21, wherein the additional filler is in the range of 1% to 90% by weight of the composite.

24. The cellulosic composite of claim 23, wherein the additional filler is in the range of 5% to 75% by weight of the composite.

25. The cellulosic composite according to claim 1, wherein the composite has a moisture uptake of less than 1 wt % after 96 hours of immersion in water.

26. The cellulosic composite according to claim 25, wherein the polymeric composite forms at least a portion of an article selected from the group consisting of: an automotive component, decking, fencing, railing, roofing, siding, a consumer article, an appliance component and a 3D printed component.

27. The cellulosic composite of claim 1, wherein the wood pulp is recycled fiber.

* * * * *